April 28, 1936.  J. E. McBURNEY  2,038,800
METHOD AND APPARATUS FOR CIRCULATING MOLTEN GLASS
Filed April 19, 1934  2 Sheets-Sheet 1
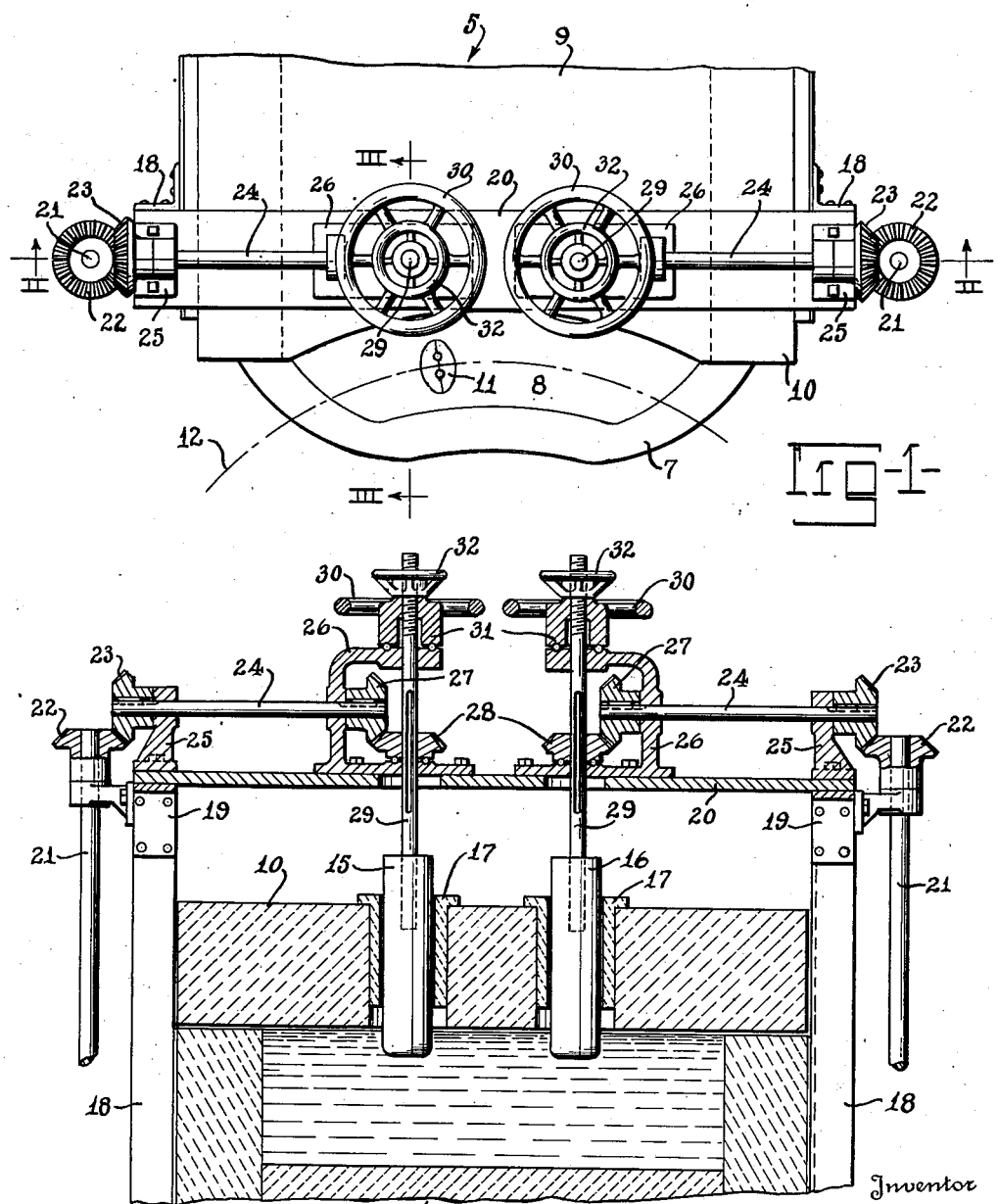

April 28, 1936. J. E. McBURNEY 2,038,800
METHOD AND APPARATUS FOR CIRCULATING MOLTEN GLASS
Filed April 19, 1934 2 Sheets-Sheet 2
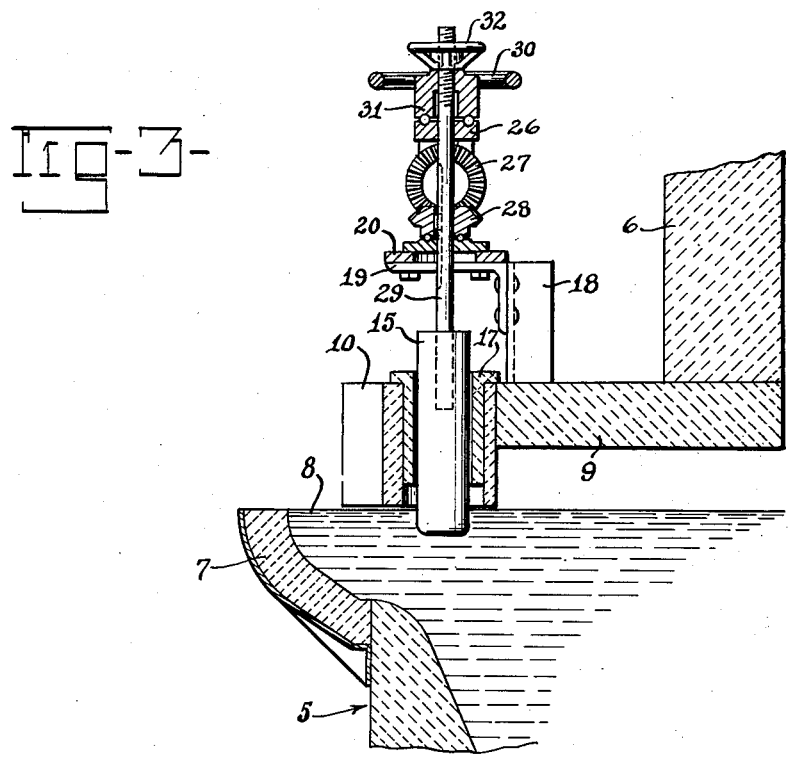
Fig-3-
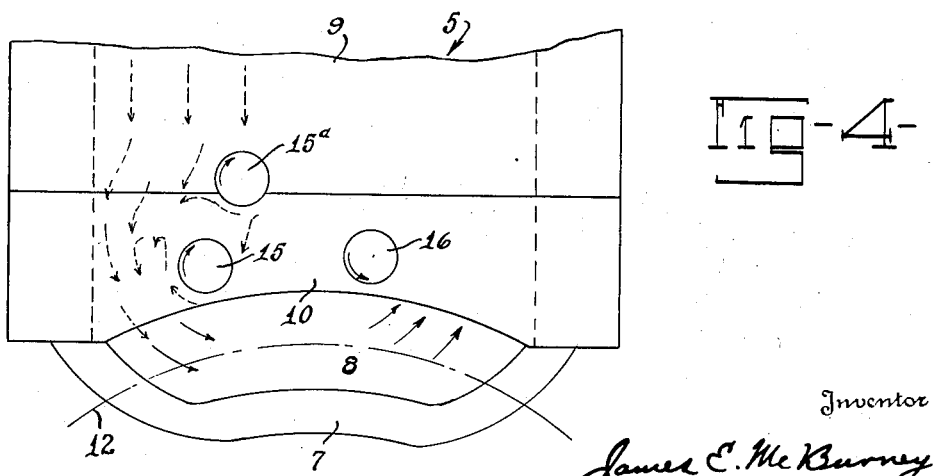
Fig-4-
Inventor
James E. McBurney
By J. F. Rule,
Attorney Patented Apr. 28, 1936

2,038,800

UNITED STATES PATENT OFFICE 2,038,800

METHOD AND APPARATUS FOR CIRCULATING MOLTEN GLASS

James E. McBurney, Alton, Ill., assignor to Owens-Illinois Glass Company, a corporation of Ohio Application April 19, 1934, Serial No. 721,300

15 Claims. (Cl. 49—56)

My invention relates to a method and apparatus for directing and controlling the flow of molten glass in a channel or chamber wherein it is desired to change the course of the natural flow, increasing the rate of flow in some portions and decreasing it in other portions. The invention may be utilized to control the flow of glass through a gathering area from which mold charges of glass are drawn by suction.

The invention is herein illustrated as applied to a furnace construction including a glass melting and refining tank having a forebay extension providing a channel through which the molten glass is caused to flow. There is thus provided an exposed gathering area of molten glass. Suction gathering molds are caused to traverse this area and gather charges of glass by suction. In order to produce high grade ware of uniform quality, it is important to maintain a uniform temperature of the glass throughout the gathering area. Heretofore, considerable difficulty has been experienced on account of the tendency of the glass to flow in a comparatively narrow channel, the glass taking the path of least resistance which lies along the inner portion of the channel or forebay. The glass nearer the rim of the channel becomes more or less chilled and stagnant or sluggish in movement. As a result, there is a substantial difference in the temperature of the glass at different points over the gathering area and this results in an unevenness of the temperature of the glass entering the molds. This objection is particularly pronounced when plural cavity molds are used, as the mold cavities are ordinarily arranged to travel in separate paths over the gathering area, one path being nearer to the rim of the pot than the other.

An object of the present invention is to overcome the above difficulties by the provision of a novel method and means for directing and controlling the flow of glass in a manner to obtain uniform temperature conditions over the gathering area.

Other objects of the invention will appear hereinafter.

In the accompanying drawings:

Fig. 1 is a plan view of an apparatus constructed in accordance with the present invention.

Fig. 2 is a sectional front elevation at the line II—II on Fig. 1.

Fig. 3 is a sectional side elevation at the line III—III on Fig. 1.

Fig. 4 is a diagrammatic plan view illustrating the path of circulation of the glass and also showing as a modification an additional rotating implement.

Referring to the drawings, the furnace tank from which the molten glass is supplied includes a section 5 extending forward beyond the main front wall 6 of the tank, said extension being provided at its forward end with a forebay 7 presenting an exposed gathering area 8 of molten glass.

A cover for the furnace extension 5 is provided by a horizontal refractory block or blocks 9 extending forward from the wall 6. A vertical wall 10 is provided at the forward end of the cover block 9 and forms the usual jack arch beneath which the glass flows to and from the gathering area.

Suction molds 11 (Fig. 1) on the mold carriage of a suction gathering machine, (not shown), travel in an annular path 12 and periodically traverse the gathering area 8. The molds while over the glass are lowered into sealing contact with the glass and gather their charges by suction in a well known manner. As shown in Fig. 1, the mold 11 is provided with a plurality of mold cavities at different radial distances from their axis of rotation so that the mold cavities travel in separate paths at different distances from the rim of the tank or forebay.

Glass circulating implements 15 and 16 which may be in the form of cylinders, tubes or other desired shape, are arranged to project downward into the glass and are rotated to cause a localized circulation of glass, thereby directing and controlling the flow through the gathering zone, and determining its path, as hereinafter pointed out. The implements 15 and 16, as shown, comprise vertically arranged cylinders of refractory material which extend downward through refractory bushings 17 mounted in openings extending through the jack arch-wall 10, with the lower ends of the implements immersed in the glass.

The framework by which the rotating implements and their operating mechanism are supported, comprises vertical angle bars 18 at opposite sides of the furnace extension 5, brackets 19 at the upper ends of the bars 18 and a horizontal supporting plate 20 mounted on said brackets and extending across the furnace. Vertical drive shafts 21 which may be rotated continuously by any suitable mechanism (not shown) have driving connection through bevel gears 22 and 23 with horizontal shafts 24 journaled in brackets 25 and 26 mounted on the plate 20. Bevel gears 27 on the inner ends of the shafts 24, mesh with gears 28 which are splined on vertical rods or stems 29 which carry the implements 15 and 16. The upper end portions of the stems 29 are screw threaded to receive correspondingly threaded hand wheels 30 having hubs 31 supported on the brackets 26. Anti-friction bearings are interposed between said hubs and the brackets 26 to permit the hand wheels 30 to rotate with the stems 29. Locking wheels 32 threaded on the stems 29 lock the hand wheels 30 to said stems for rotation therewith. This construction permits vertical adjustment of the implements 15 and 16 so that they may be lowered to extend into the glass to any desired depth.

The operation will be understood by reference to the diagrammatic view (Fig. 4) in which the arrows indicate the general direction and path of flow of the glass to and through the forebay. The molds 11 which travel from left to right across the gathering area cause a movement of glass through the forebay in the general direction of travel of the molds. If desired, supplemental means (not shown) may be provided to assist in maintaining a circulation of the glass. As the glass flowing through the forebay takes the path of least resistance, there is a tendency for it to take a short circuit without traversing the full length of the forebay. The glass at the gathering area is exposed to the outside air which tends to rapidly lower its temperature and the glass near the rim, that is, along the outer edge of the pool, cools more rapidly than that nearer the furnace and, consequently, becomes comparatively stiff and sluggish, which further increases the unevenness of the flow through the gathering zone.

The rotation of the implement 15 (Fig. 4) in a clockwise direction causes a circulation of the glass immediately surrounding the implement and in the same direction. The glass between the implement and the forebay and adjacent to the implement is thus moved from right to left, as indicated by the arrows, thereby causing the glass flowing through the gathering zone to enter the forebay near the left hand end thereof. The implement 16 rotating in a counter-clockwise direction, as indicated by the arrow, directs the flow of glass toward the right hand end of the bay. In other words, the implement 16 prevents the returning stream of glass from flowing back into the furnace in a path near the center of the gathering zone. The combined action of the implements 15 and 16 is to extend the path of flow through the gathering zone both as to length and width and definitely locate and control the path of flow, thereby producing a comparatively uniform flow throughout the entire gathering zone and a uniform temperature of glass over the entire area.

If desired, additional implements or units may be provided to supplement the action of the implements 15 and 16. One such additional unit or implement 15a is shown in Fig. 4, said implement rotating in a clockwise direction, thereby assisting in deflecting the glass entering the forebay toward the left hand end thereof. By adjusting the implements up and down, the depth to which they act on the glass may be regulated and controlled. Such adjustment regulably varies and controls the extent to which the path and rate of flow is modified and controlled by the implements. It will be noted that the rotating implements induce localized currents of glass in annular, short circuits or paths immediately surrounding said implement, and that these short circuits are surrounded by the closed path of the main current of glass which flows from the tank into and through the forehearth 7 and back into the tank.

Modifications may be resorted to within the spirit and scope of my invention.

I claim:

1. The combination of a container for molten glass, means for causing a circulation of the glass through a predetermined zone, and means operating in the glass adjacent said zone for producing an opposing current of glass in a direction opposite to the general direction of flow through said zone and thereby modifying the path of movement of the glass through said zone.

2. The combination of a container for a pool of molten glass, means for causing a circulation of glass in the pool through a predetermined zone, an implement extending into the glass adjacent said zone, and means for actuating said implement and causing the surface thereof nearest said zone and the glass between said implement and said zone, to move in a direction opposite to the general direction of flow through said zone.

3. The combination of a container for a pool of molten glass, means for causing a circulation of glass in the pool through a predetermined zone, implements in contact with the glass and positioned respectively near the opposite ends of said zone, and means for actuating said implements in directions to cause the glass between one said implement and said zone to move in a direction opposite to the general direction of movement of the glass through said zone, and the glass between the other said implement and said zone to move in the same general direction as the glass moves through said zone.

4. The combination of a tank to contain molten glass, a channel to and through which glass flows from the main body of glass in the tank and from which the glass flows back into the tank, an implement extending into the glass adjacent said channel, and means for rotating said implement in a direction to cause the glass between said implement and channel to move in a direction opposite to that in which the adjacent glass is moving through the channel.

5. The combination of a tank to contain molten glass, a channel to and through which glass flows from the main body of glass in the tank and from which the glass flows back into the tank, a plurality of implements projecting into the glass adjacent said channel, and means for rotating said implements in opposite directions and thereby causing the glass between one said implement and the channel to move in a direction opposite to the general direction of flow through the channel, and causing the glass between the other implement and channel to flow in the same general direction as said flow through the channel.

6. The combination of a tank to contain molten glass, a forebay extending along the front wall of the tank and forming an extension of the tank, means for causing a circulation of glass through the forebay, means operating in the glass adjacent said forebay for modifying and controlling the path of movement of the glass through the forebay, said means comprising an implement having a surface immersed in the glass adjacent the stream of glass flowing through the forebay, and means causing the said surface to move through the glass in a direction opposite to the direction of movement of the adjacent glass flowing through the forebay.

7. The combination of a tank to contain molten glass, a forebay extending along the front wall of the tank and forming an extension of the tank, means for causing a flow of glass from the tank into and through the forebay and back into the tank, a plurality of implements extending into the glass adjacent the path of the glass through the forebay, and means for rotating said implements in opposite directions.

8. The combination of a tank to contain molten glass, a forebay extending along the front wall of the tank and forming an extension of the tank, means for causing a circulation of glass through the forebay, a plurality of implements extending into the glass adjacent the path of the glass through the forebay, means for rotating said implements in opposite directions, and means for individually adjusting said implements up and down and thereby adjusting the depth to which they are immersed in the glass.

9. The combination of a tank to contain molten glass, a bridge wall extending across the front of the tank above the glass therein, a forebay projecting forward from the tank and providing an exposed area of glass in front of the bridge wall, means for causing a circulation of glass from the main body of glass in the tank through said forebay and back into the tank, an implement projecting downward through an opening in the bridge wall and movable vertically therethrough, said implement being positioned forward of the inner face of the bridge wall and partially immersed in the glass, and means for rotating said implement.

10. The combination of a tank to contain molten glass, a bridge wall extending across the front of the tank above the glass therein, a forebay projecting forward from the tank and providing an exposed area of glass in front of the bridge wall, means for causing a circulation of glass from the main body of glass in the tank through said forebay and back into the tank, a plurality of implements located adjacent the opposite ends of the forebay and extending into the glass, and means for rotating said implements in opposite directions.

11. The combination of a tank to contain molten glass, a bridge wall extending across the front of the tank above the glass therein, a forebay projecting forward from the tank and providing an exposed area of glass in front of the bridge wall, means for causing a circulation of glass from the main body of glass in the tank through said forebay and back into the tank, a plurality of implements located adjacent the opposite ends of the forebay and extending into the glass, and means for rotating said implements in opposite directions, the implement adjacent the end of the forebay into which the glass enters, rotating in such direction that the side thereof adjacent the stream in the forebay moves in a direction opposite to said stream, the other said implement rotating in a direction such that the side thereof adjacent the stream in the forebay moves in the same general direction as said stream.

12. The combination of a tank to contain molten glass, a bridge wall extending across the forward end of the tank above the glass, said tank having a forebay extending forward beyond the bridge wall and providing a channel through which the glass is circulated, said bridge wall having openings extending vertically therethrough, implements extending downward through said openings with their lower ends immersed in the glass, said implements being of smaller diameter than the openings, permitting them to be lowered through the openings to operative position, and interconnected mechanism for continuously rotating said implements in synchronism.

13. The combination of a container for a pool of molten glass, means for causing a stream flow of the glass in the pool in a substantially U-shaped path, and mechanical means for causing movements of glass in short circuits in closed paths within said U-path and adjoining said stream flow at the bends thereof and thereby modifying said stream flow.

14. The method which comprises causing a main current of glass to flow in a pool of molten glass, and producing a localized flow of glass in a short circuit within the pool with said short circuit adjacent said main current and that portion of the glass in said localized circuit nearest said main current moving in a direction opposite thereto.

15. The method which comprises causing a circulation of a stream of glass in a closed circuit within a pool of molten glass, and causing circulation of glass in localized short circuits within and adjacent to said closed circuit, with the glass in one short circuit adjoining said main current and flowing in a direction opposite thereto, and the glass in another short circuit adjoining said main current and flowing in a direction parallel therewith.

JAMES E. McBURNEY.